US007650076B2

(12) United States Patent
Su et al.

(10) Patent No.: US 7,650,076 B2
(45) Date of Patent: Jan. 19, 2010

(54) DYNAMIC BLOCKING OF TOKEN-CONTROLLED DATA TRANSMISSIONS IN COMMUNICATION NETWORKS

(75) Inventors: Ching-Fong Su, Milpitas, CA (US); Cechan Tian, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 11/283,097

(22) Filed: Nov. 17, 2005

(65) Prior Publication Data

US 2007/0110438 A1    May 17, 2007

(51) Int. Cl.
*H04J 14/02* (2006.01)
(52) U.S. Cl. .............................. 398/83; 398/82; 398/85
(58) Field of Classification Search ............... 398/79, 398/82, 83, 85
See application file for complete search history.

(56) References Cited

U.S. PATENT DOCUMENTS

| 5,418,785 | A | 5/1995 | Olshansky et al. | 370/85.5 |
|---|---|---|---|---|
| 5,896,212 | A | 4/1999 | Sotom et al. | 359/125 |
| 2002/0126343 | A1* | 9/2002 | Fumagalli et al. | 359/118 |
| 2002/0149818 | A1* | 10/2002 | Tomofuji et al. | 359/124 |
| 2002/0181503 | A1 | 12/2002 | Montgomery, Jr. | 370/468 |
| 2005/0191054 | A1* | 9/2005 | Aoki et al. | 398/45 |
| 2006/0045527 | A1* | 3/2006 | Maeda et al. | 398/79 |

FOREIGN PATENT DOCUMENTS

EP    1 578 048 A2    3/2005
EP    1 578 049 A2    3/2005

OTHER PUBLICATIONS

Harry Dutton, 'Understanding Optical Communications', IBM International Technical Support Organization, Sep. 1998.*
White, I.M., et al., "Architecture and Protocols for HORNET: A Novel Packet-over-WDM Multiple-Access MAN", Stanford University Optical Communications Research Laboratory, 5 unnumbered pages. *GLOBECOM2000*, Nov. 2000.
Cai, James, et al., "Lightring: A Distributed and Contention-Free Bandwidth On-Demand Architecture", pp. 1-14. ONDM 2001.
Qiao, Chunming, et al., "Optical Burst Switching (OBS)—A New Paradigm for an Optical Internet", pp. 1-23. Journal of High Speed Networks, vol. 8, No. 1, pp. 69-84, Jan. 1999.

(Continued)

*Primary Examiner*—Quan-Zhen Wang
(74) *Attorney, Agent, or Firm*—Baker Botts L.L.P.

(57) ABSTRACT

A method for token-controlled data transmission includes receiving a token including transmission data specifying one of a plurality of data channels and a time window. A burst blocker is configured, based at least in part on the transmission data, for the selective communication of the specified data channel on an optical transmission medium having the plurality of data channels. The selective configuration of the burst blocker includes splitting the specified data channel from the plurality of data channels, configuring the burst blocker in a first configuration during a time other than the time window to rejoin the specified data channel with the plurality of data channels for transmission of the plurality of data channels toward a destination node, and configuring the burst blocker in a second configuration during the time window to block the specified data channel to prevent the transmission of the specified data channel.

44 Claims, 3 Drawing Sheets

OTHER PUBLICATIONS

Xu, Lisong, et al., "Techniques for Optical Packet Switching and Optical Burst Switching", IEEE Communications Magazine, pp. 136-142, Jan. 2001.

"Fiber Distributed Data Interface", Internetworking Technologies Handbook, pp. 8-1-8-12. By Cisco Systems, Inc. http://www.cisco.com/univercd/cc/td/doc/cisintwk/ito_doc/index.htm.

Hiraki, Kei, et al., "Data Reservoir: A New Approach to Data-Intensive Scientific Computation", 6 unnumbered pages. *2002 International Symposium on Parallel Architecture, Algorithms, and Networks*, May 2002.

Koetter, Ralf, et al., "Beyond Routing: An Algebraic Approach to Network Coding", 2002 IEEE, 9 unnumbered pages.

Katabi, Dina, et al., "Congestion Control for High Bandwidth-Delay Product Networks", 14 unnumbered pages. ACM SIGCOMM, Pittsburgh, PA, Aug. 2002.

Dunigan, Tom et al., "A TCP Tuning Daemon", 2002 IEEE, pp. 1-16.

"Grid Datafarm: Record Speed Data Processing between Japan and U.S.", pp. 7-9. "Grid Datafarm Bandwidth Challenge at SC2002," http://datafarm.apgrid.org/event/bwc02/.

Leland, Will E., et al., "On the Self-Similar Nature of Ethernet Traffic (Extended Version)", 1994 IEEE, pp. 1-15.

Jain, Raj, "Performance Analysis of FDDI", Digital Technical Journal, vol. 3, No. 3, Summer 1991 36 unnumbered pages.

Kaur, Jasleen, et al., "End-to-end Fairness Analysis of Fair Queuing Networks" Laboratory for Advanced Systems Research, Department of Computer Sciences, University of Texas at Austin, pp. 1-10. Proceedings of 23rd IEEE International Real-Time Systems Symposium, Austin, TX, Dec. 2002.

"Information Technology-Telecommunications and Information Exchange Between Systems—Local and Metropolitan Area Networks—Specific Requirements—Part 5: Token Ring Access Method and Physical Layer Specifications", 1998 IEEE, cover page, pp. iv-x and pp. 1-243.

EPO Search Report for Application No. 06021730.4-2415, 9 pages, May 3, 2007.

* cited by examiner

DYNAMIC BLOCKING OF TOKEN-CONTROLLED DATA TRANSMISSIONS IN COMMUNICATION NETWORKS

TECHNICAL FIELD OF THE INVENTION

The present invention relates generally to communication networks and, more particularly, to token-controlled data transmissions in optical networks.

BACKGROUND OF THE INVENTION

Optical networks transmit data in the form of optical signals carried over optical fibers. To maximize utilization of network bandwidth, optical networks employ technology such as time division multiplexing (TDM) or wavelength division multiplexing (WDM). For example, Synchronous Optical NETwork (SONET) is an optical transmission standard that uses TDM to multiplex data over optical networks.

SUMMARY OF THE INVENTION

In accordance with the present invention, techniques for token-controlled data transmissions in communication networks are provided. According to particular embodiments, these techniques enable network elements to dynamically remove an optical signal from a communication network.

According to a particular embodiment, a method for token-controlled data transmission includes receiving a token including transmission data specifying one of a plurality of data channels and a time window. A burst blocker is configured, based at least in part on the transmission data, for the selective communication of the specified data channel on an optical transmission medium having the plurality of data channels. The selective configuration of the burst blocker includes splitting the specified data channel from the plurality of data channels, configuring the burst blocker in a first configuration during a time other than the time window to rejoin the specified data channel with the plurality of data channels for transmission of the plurality of data channels toward a destination node, and configuring the burst blocker in a second configuration during the time window to block the specified data channel to prevent the transmission of the specified data channel.

According to another embodiment, a method for token-controlled data transmission includes receiving an optical transmission comprising a plurality of data channels. A first filter is used to split a specified data channel from the plurality of data channels. The specified data channel is received at a switch. The switch is used to pass the specified data channel when the switch is in a first configuration and to block the specified data channel when the switch is in the second configuration. At least a portion of the plurality of data channels is received from the first filter at a second filter. At the second filter, the specified data channel is joined with the plurality of data channels when the switch is in the first configuration.

Embodiments of the invention provide various technical advantages. These techniques may use a token-based control scheme for controlling transmissions. More specifically, a nodes in an optical network may use a token-based scheme that enables separate control over each channel within the network. Thus, a node may operate in transmit, receive, or pass-through modes with respect to different wavelengths or channels used by the network. Accordingly, a node may operate in transmit node with respect to a first wavelength or band of wavelengths while simultaneously operating in pass-through mode with respect to a second wavelength or band of wavelengths.

These techniques may also allow for the selective dropping of optical signals of certain characteristics. The selective removal of optical signals may ensure that transmitted data does not collide with unwanted optical signals on the network. Additionally, optical signals may be prevented from circulating along the network indefinitely. In one example embodiment, an optical burst may be removed once the optical burst has passed through its intended destination. As a result, multiple burst transmissions of the same wavelength may be permitted over non-overlapping segments of the network, and the network may be said to allow spatial reuse. In another example embodiment, an optical burst may be removed once the optical burst is returned to its source. Simpler design may be possible since the burst blocker may need only operate on those specific wavelengths or bands that are added by the source node.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1A:
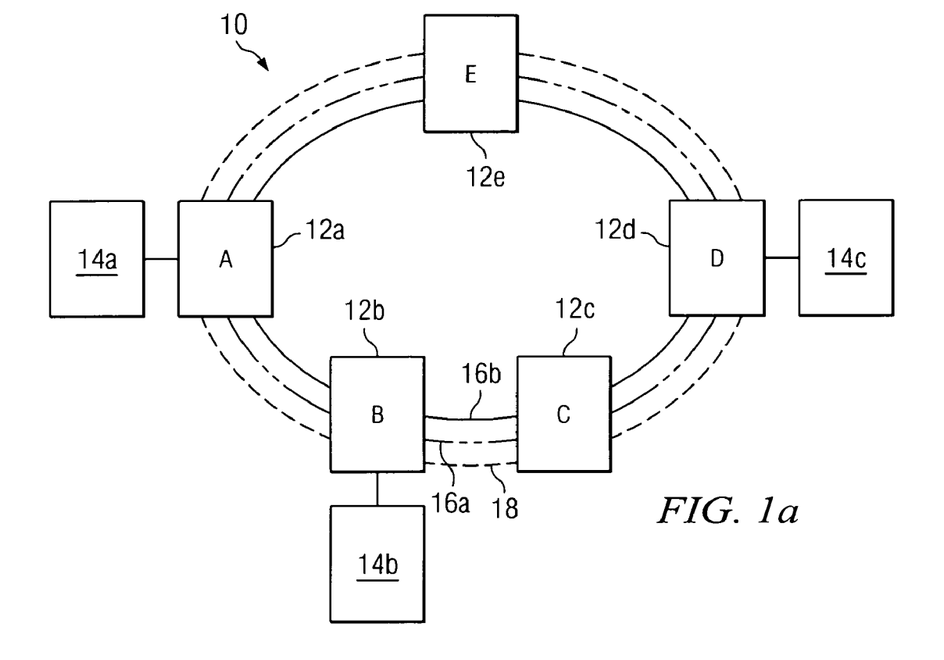
FIG. 1a illustrates a communication network that includes network nodes that operate in accordance with various embodiments of the present invention.

FIG. 1a illustrates a communication network, indicated generally at 10, that includes a plurality of network nodes 12 that operate in accordance with various embodiments of the present invention. In general, network 10 supports data transmission between nodes 12. More specifically, nodes 12 use a token scheme to control communications.

According to particular embodiments, network 10 forms an optical communication ring and nodes 12 are optical communication nodes. The remainder of this discussion focuses primarily on the embodiment of network 10 and nodes 12 as optical equipment. However, it should be understood that the disclosed techniques may be used in any suitable type of network.

As illustrated, network 10 is an optical communication ring and nodes 12 are optical communication nodes. In operation, network 10 utilizes wavelength division multiplexing (WDM), in which a number of optical channels are carried over a common path by modulating the channels by wavelength. However, it should be understood that network 10 may utilize any suitable multiplexing operation, and a channel represents any suitable separation of available bandwidth, such as wavelength in WDM. Furthermore, network 10 may be any of various network types, including a Metropolitan Area Network (MAN). Also, network 10 may operate in clockwise and/or counterclockwise direction. For example, network 10 may include two opposing rings.

Each node 12 represents hardware, including any appropriate controlling logic, capable of linking to other network equipment and transmitting data. In operation, the ring configuration of network 10 permits any node 12 to transmit data to any other node 12 in network 10. As to adjacent nodes 12, data may be transmitted directly. As to nonadjacent nodes 12, data is transmitted by way of one or more intermediate nodes 12. For example, node 12a may transmit data directly to adjacent nodes 12b and 12e, but node 12a transmits data to nonadjacent node 12d by way of intermediate nodes 12b and 12c or 12e.

Nodes 12 may be coupled to data sources 14. In operation, data sources 14 provide data to network 10 or receive data from network 10. A data source 14, such as data source 14a, may be a Local Area Networks (LAN), a Wide Area Network (WAN), or any other type of device that may send or receive data.

Nodes 12 are coupled to one another by optical fiber 16. In operation, fiber 16 transmits optical signals between nodes 12. Fiber 16 may be a single uni-directional fiber, a single bi-directional fiber, or a plurality of uni- or bi-directional fibers. As illustrated, network 10 includes two unidirectional fibers 16a and 16b. Data transmitted clockwise on network 10 is carried on fiber 16a, while data transmitted counterclockwise over network 10 is carried on fiber 16b. Fiber 16 may be made of material capable of transmitting optical signals having multiple wavelengths.

Nodes 12 are also coupled to one another by a control channel 18. Control channel 18 may be an optical channel or any other type of channel suitable to communicate control messages, including tokens, between adjacent nodes 12. For example, control channel 18 may be a separate wavelength, called an optical supervisory channel (OSC), when network 10 utilizes WDM. Control messages control the operation of data transmissions on network 10. According to particular embodiments, tokens and control messages may be processed at every node 12, while data transmissions may pass intermediate nodes 12 without electronic processing.

In operation, nodes 12 use a token-based control scheme for controlling transmissions. More specifically, nodes 12 may use a token-based scheme that enables separate control over each channel within network 10. According to particular embodiments, nodes 12 may use channel specific tokens to enable individualized control over each separate wavelength. As a specific example of operation, consider FIG. 1b.

Figure 1B:
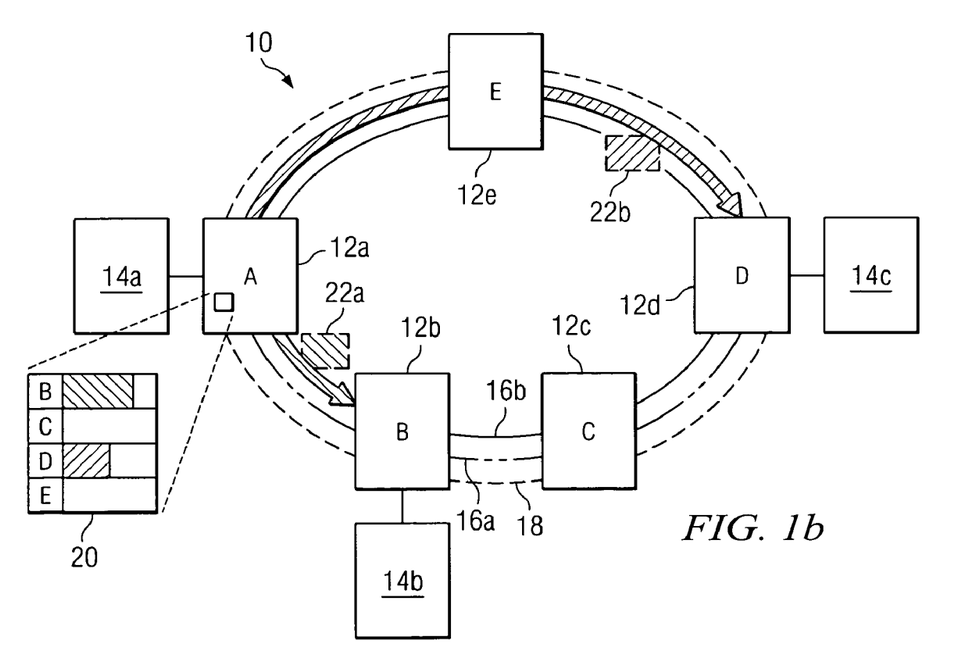
FIG. 1b illustrates token-controlled data transmissions on a communication network in accordance with one embodiment of the present invention.

FIG. 1b illustrates token-controlled data transmissions on a communication network in accordance with one embodiment of the present invention. In this example, node 12a receives data from data source 14a to be sent over network 10. The data may be intended for transmission through one or more nodes 12 on network 10. Upon receipt, node 12a may buffer the data in a virtual queue 20, which represents any form of volatile or nonvolatile memory operable to store data. For example, data intended for node 12b may be stored in a row labeled B within virtual queue 20, while data intended for node 12d may be stored in a row labeled D within virtual queue 20. Note, however, that the data may be stored in any one of various manners within virtual queue 20.

Node 12a waits to receive a token before transmitting the data stored in virtual queue 20 on network 10. Tokens provide coordination among nodes 12 so as to avoid contention on network 10. Tokens are any communications received by node 12a that authorize node 12a to transmit data on network 10. Tokens grant node 12 permission to schedule and/or send data transmissions on authorized data channels. According to particular embodiments, each data channel utilizes at least one token. For example, a token may authorize node 12a to schedule a data transmission on a particular data channel of network 10. The token may alternatively or additionally authorize node 12a to transmit data immediately on a particular data channel of network 10. The particular data channel may be any suitable separation of available bandwidth. For example, the particular data channel may be a particular wavelength if network 10 utilizes WDM. Furthermore, the token may be communicated to node 12a in a control message received by node 12a or in one of various other methods.

Before transmitting data on network 10, a transmitting node 12 may communicate control messages to other nodes 12. In operation, control messages inform one or more nodes 12 regarding future transmissions of data over network 10. Control messages may identify data channels and destinations of future transmissions. Control messages may also identify transmission sizes and/or transmission timings. A node 12, after receiving a control message identifying it as a destination, may reconfigure optical and/or electrical components in order to receive the future transmission destined for it. For example, a node 12 named as a destination of the future transmission may adjust an optical filter to receive the future transmission.

Thus, after node 12a receives a token authorizing transmission on a data channel and before node 12a transmits the data, node 12a communicates a control message over network 10. For example, before node 12a transmits data to node 12b, node 12a communicates a control message to node 12b. Likewise, before node 12a transmits data to node 12d, node 12a communicates a control message to node 12d.

After communicating the appropriate control messages, nodes 12 may transmit data stored in virtual queue 20 on the authorized data channel of network 10. As illustrated, data intended for node 12b may be transmitted counterclockwise over fiber 16b to node 12b, and data intended for node 12d may be transmitted clockwise over fiber 16a to node 12d. Transmission 22a represents a transmission from node 12a to node 12b, and transmission 22b represents a transmission from node 12a to 12d. Transmission 22a proceeds directly from node 12a to 12b, but transmission 22b passes through node 12e to reach node 12d. Transmissions 22a and 22b are sent over fiber 16. Control messages related to transmissions 22a and 22b may be sent over control channel 18.

Figure 2:
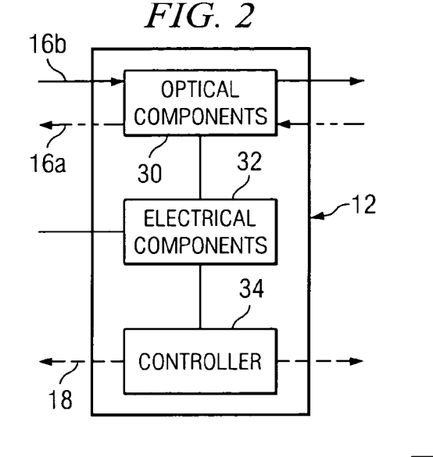
FIG. 2 is a block diagram illustrating functional elements of a node from the network.

FIG. 2 is a block diagram illustrating functional elements of a node 12 from network 10. Node 12 includes optical components 30, electrical components 32, and a controller 34. Optical components 30 couple to fiber 16, and electrical components 32 couple to optical components 30. Controller 34 couples both to optical components 30 and electrical components 32 as well as to control channel 18.

In operation, optical components 30 receive, pass, and transmit optical signals associated with data, while electrical components 32 receive data from or transmit data to optical components 30. Electrical components 32 may also receive data from or transmit data to data sources 14, but, according to particular embodiments, optical components 30 may bypass electrical components 32 and receive data or transmit data directly to data sources 14. Furthermore, in certain embodiments only optical components may be present. Controller 34 controls optical components 30 and electrical components 32, to the extent they are present, and may communicate tokens and control messages using control channel 18.

In the embodiment illustrated, node 12 provides at least three modes of operation for a given wavelength or data channel: a transmit mode, a pass-through mode, and a receive mode. In transmit mode, node 12 may operate to transmit data on network 10 at the given wavelength or on the particular data channel. In pass-through mode, node 12 may operate to allow data transmitted at the given wavelength or on the particular channel to pass through node 12 without electronic processing. In receive mode, node 12 may operate to receive data transmitted at the given wavelength or on the particular data channel from network 10. Any particular node 12 may operate in any mode with respect to a wavelength or in multiple modes at any point in time. Thus, it is recognized that node 12 may operate in transmit node with respect to a first wavelength or data channel while simultaneously operating in a pass-through mode with respect to a second wavelength or data channel.

While in the transmit mode with respect to a given wavelength or data channel, node 12 receives a token authorizing data transmission on the data channel. In this situation, controller 34 may determine whether data is available to be transmitted. If data is available, controller 34 may prepare and communicate a control message to the next adjacent node 12 indicating one or more of the following: the destination of the data; the data channel; the size of the data transmission; and/or the timing of the data transmission. After communicating the control message, controller 34 may control optical components 30 and electrical components 32 to transmit the data over network 10 according to the parameters specified in the control message.

While in the pass-through mode with respect to a given wavelength or data channel, node 12 receives a control message that neither includes a token nor indicates node 12 is a destination. Controller 34 may forward the control message to the next adjacent node 12 and allow data to pass through node 12 without electronic processing. In other words, optical components 30 may simply pass the data to the next adjacent node 12 without electronic processing by electrical components 32. A variation of this situation may occur when node 12 allows the data to pass but also stores a copy of the data using electrical components 32. This technique provides fault management. For example, if fiber 16 is cut and data does not arrive at its intended destination, the data may be redirected to its destination by node 12.

While in the receive mode with respect to a given wavelength or data channel, node 12 receives a control message indicating that it is a destination. In this situation, controller 34 may control optical components 30 and electrical components 32 to receive data over network 10 according to parameters specified in the control message.

As illustrating each of these three modes, consider the data transmission from node 12a to node 12d through node 12e in FIG. 1b. In this example, all three modes occur: node 12a operates in the transmit mode; node 12e operates in the pass-through mode; and node 12d operates in the receive mode. Thus, tokens and control messages may be processed at all three nodes 12, but data transmissions may pass through node 12e without electronic processing.

Figure 3:
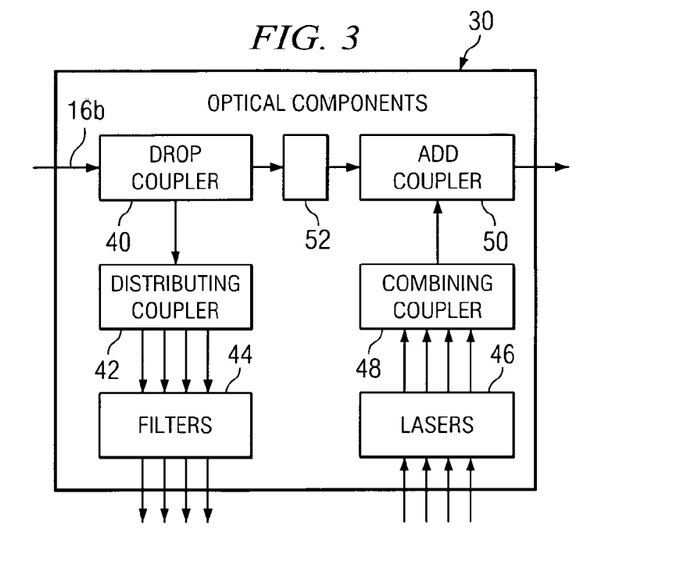
FIG. 3 illustrates optical components in accordance with various embodiments of the present invention.

FIG. 3 illustrates optical components 30 in accordance with various embodiments of the present invention. According to particular embodiments, optical components 30 may operate to receive and/or transmit optical signals on network 10. Optical components 30 that may be used to receive optical signals include a drop coupler 40, a distributing coupler 42, and filters 44. Optical components 30 that may be used to transmit optical signals include lasers 46, a combining coupler 48, and an add coupler 50. For example, when node 12 is configured to receive data from network 10 with respect to a particular data channel, drop coupler 40, distributing coupler 42, and filters 44 may operate to receive optical signals at the particular data channel from fiber 16b. When node 12 is configured to transmit data onto network 10 on a particular data channel, lasers 46, combining coupler 48, and add coupler 50 may operate to transmit optical signals onto fiber 16b on the particular data channel. Note that optical components 30 may also operate to pass optical signals without optical processing.

Fiber 16b is coupled to drop coupler 40, distributing coupler 42, and filters 44. When node 12 is configured to receive data from network 10 on a given data channel, drop coupler 40 operates to drop an optical signal carried on fiber 16b, distributing coupler 42 operates to distribute the dropped signal, and filters 44 operate to filter the distributed signals. In this manner, optical components 30 tap into fiber 16b to receive network data on the particular data channel, such as data intended for data source 14.

Fiber 16b is also coupled to lasers 46, combining coupler 48, and add coupler 50. When node 12 is configured to transmit data onto network 10 on a particular data channel, lasers 46 operate to generate optical signals corresponding to the data, combining coupler 48 operates to combine generated signals, and add coupler 50 operates to add the combined signal onto fiber 16b. In this manner, optical components 30 tap into fiber 16b to transmit local data, such as data generated by data source 14.

Note that filters 44 and lasers 46 may be tunable or static. A static configuration may reduce the amount of time used to configure optical components 30 to send or receive data. However, a dynamic configuration may provide more flexibility. For example, using tunable filters and lasers, lightpaths may be configured and reconfigured. The remainder of this discussion focuses primarily on embodiments of optical components 30 that include one or more tunable filters 44 and lasers 46. However, it should be understood that the disclosed techniques may be used with either tunable or static filters 44 and lasers 46.

Optical components 30 also includes a burst blocker 52, which may be used to drop optical signals of certain characteristics. The removal of optical signals by burst blocker 52 ensures that transmitted data does not collide with unwanted optical signals on fiber 16. A collision refers to the situation where two optical signals of the same wavelength overlap in the time domain. Optical signals of different wavelengths are independent and, thus, have no issue of collision in a WDM network. In addition to preventing collisions, burst blocker 52 also prevents optical signals from circulating along network 10 indefinitely.

Where filters 44 and lasers 46 are tunable (not static), burst blocker 52 must also be tunable since the source and destination nodes and the wavelength of the optical signal changes dynamically. A tunable burst blocker 52 is configurable on a per-burst basis, according to the token-controlled burst transmission. In particular embodiments, blocker 52 includes one or more thin film filters (TFFs) that operate as a sub-band rejection filter to provide signal blocking on a per-waveband basis. For example, burst blocker 52 may be used at times when node 12 transmits data using a particular band. In other embodiments, blocker 52 may include one or more TFFs that operate as a wavelength blocker that blocks a specific wavelength. For example, burst blocker 52 may be used at times when node 12 transmits data using a particular wavelength. In either embodiment the blocker is designed to block specific band (or wavelength), but pass other optical signal with little loss.

For each optical burst, there are two possible locations for blocking or stripping the optical signal from network 10. In one example embodiment, a data channel may be removed from a plurality of data channels transmitted on fiber 16 once the data channel has passed through its intended destination. Stated differently, a burst blocker 52 may, in particular embodiments, operate to remove a data channel at the destination such that no burst circulates beyond the intended destination. Such a burst blocker 52 may be said to perform "destination stripping." In a network utilizing destination-stripping, each receiving node 12 includes a burst blocker 52 configured to block or pass certain wavelengths or bands of wavelengths at a specified time in a dynamic manner. In particular embodiments, a destination-stripping burst blocker may include a TFF configured for each wavelength or band that is in use by any of nodes 12 in network 10. The TFFs of a destination-stripping burst blocker may be dynamically configured and reconfigured through token control.

Because the wavelengths or band of wavelengths that may be blocked by a destination-stripping burst blocker are not fixed, a destination-stripping burst blocker 52 permits spatial reuse. For example, if node 12a, as a source node, sends a token-controlled optical transmission to node 12d, as a destination node, node 12d includes a burst blocker 52 that would operate to strip the optical signal from ring 16 upon receiving it. Because the optical transmission does not circulate beyond node 12d, other nodes 12 in the ring may use simultaneously transmit optical signals of the same wavelength as the token-controlled optical transmission from node 12a to node 12d. Accordingly, node 12c may send an optical transmission to node 12b on the same wavelength used by node 12a to send the optical transmission to node 12d. Because multiple burst transmissions of the same wavelength are permitted over non-overlapping segments of network 10, the network 10 is said to allow spatial reuse.

In another example embodiment, a data channel signal may be removed from fiber 16 once the data channel is returned to its source. Accordingly, burst blocker 52 may, in particular embodiments, be configured to perform "source stripping." In a network utilizing source-stripping, each transmitting node 12 includes a burst blocker 52 configured to block token-controlled data channels such that the returning data channel will not collide with subsequent optical bursts being sent onto network 10 within the same wavelength or band. In particular embodiments, a source-stripping burst blocker may include a TFF for each wavelength or band that may be transmitted by the node 12 associated with the burst blocker 52. Similar to a destination-stripping burst blocker, the TFFs of a source-stripping burst blocker may be dynamically configured and reconfigured through token control. However, the TFF design of a source-stripping burst blocker is simpler than a destination-stripping burst blocker since the burst blocker need only operate on those specific wavelengths or bands that are added by the transmitting node. Stated differently, a source-stripping burst blocker need not block transit bursts that are initiated by another node 12. However, because the wavelengths or bands that may be blocked by a source-stripping burst blocker are fixed, a source-stripping burst blocker does not have the benefit of spatial reuse.

For example, if node 12a, as a source node, sends a token-controlled data channel transmission to node 12d, as a destination node, the optical burst passes through and gets dropped by node 12d. The optical signal or optical burst then continues around ring 16 in the same direction until it is returned to node 12a. Node 12a may, in particular embodiments, include a burst blocker 52 that would operate to strip the returning optical signal from ring 16 upon receiving it. Because the optical transmission circles the entire ring 16 before it is stripped, however, nodes 12 that operate as transit nodes while the data channel is returned to node 12a (i.e., nodes 12c and 12b, in the above-described example) may not simultaneously transmit optical signals on the same data channel as the token-controlled optical transmission from node 12a to node 12d. An advantage to source-stripping, however, is that a source node 12 is assured that a data channel is clean prior to an optical transmission.

Although specific components have been illustrated and described in FIG. 3, other components may be added and/or components may be removed, so long as the components provide suitable functionality. Also, while FIG. 3 shows components corresponding to transmissions using fiber 16b, similar or different optical components may be used in conjunction with transmissions over fiber 16a.

Figure 4:
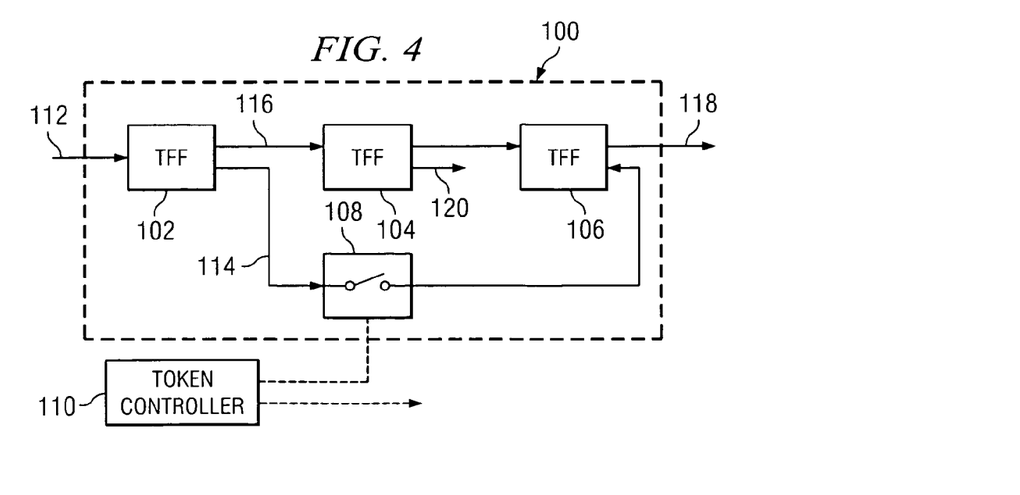
FIG. 4 illustrates a configurable burst blocker in accordance with one embodiment of the present invention.
Figure 5:
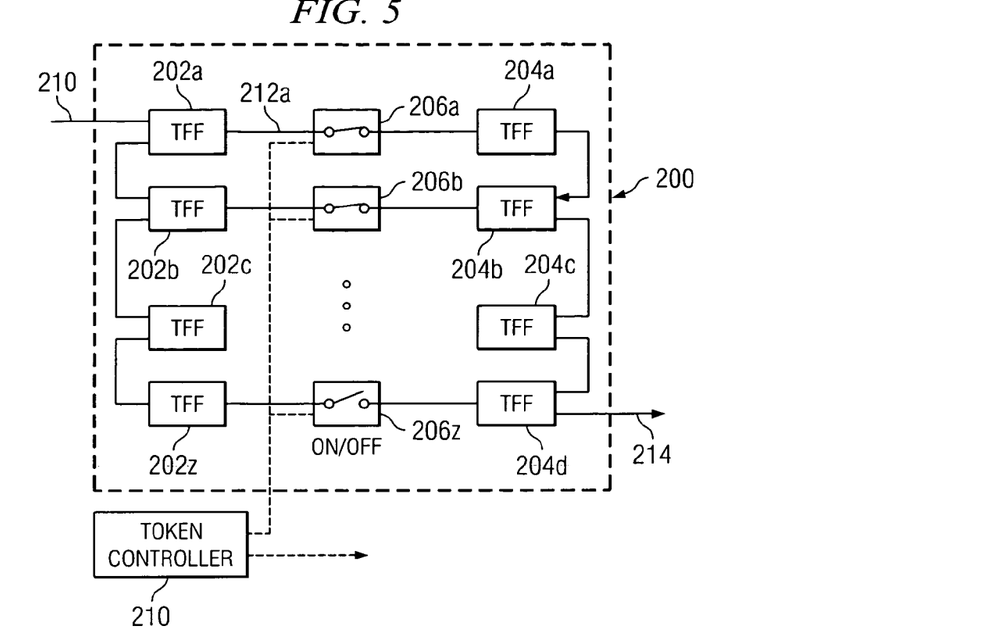
FIG. 5 illustrates a configurable burst blocker for blocking multiple wavelengths in accordance with another embodiment of the present invention.

Example embodiments of a burst blocker 52 are described in more detail with regard to FIGS. 4 and 5. Specifically, FIG. 4 illustrates a configurable burst blocker 100 in accordance with one embodiment of the present invention. In the illustrated embodiment, burst blocker 100 includes a first filter 102, a second filter 104, and a third filter 106. It is recognized, however, that the illustrated embodiment is but one example of a configurable burst blocker 100. Burst blocker 100 may include more or fewer filters or other components as is appropriate for the dynamic blocking of token-controlled data transmissions. Burst blocker 100 also includes a switch 108 that operates to selectively open and close in response to tokens received from token controller 110. In particular embodiments, switch 108 may include an Electro-optic (EO) switch that operates at sub-micro second switching times. When switch 108 is in the open position, burst blocker 100 operates to remove an optical burst from the transmission ring 16.

In an example scenario, burst blocker 100 is designed to block a specified data channel from an optical transmission of a plurality of data channels. For example, burst blocker 100 may be designed to block a data channel corresponding with a wavelength $\lambda_1$. Accordingly, burst blocker 100 may include filters 102, 104, and 106 having a center frequency of $\lambda_1$. In particular embodiments, filters 102, 104, and 106 may include an appropriate combination of thin film filters (TFFs). In operation, an incoming signal 112 enters first filter 102, which operates to drop a first portion 114 of the signal. In this example, first portion 114 is the data channel corresponding with wavelength $\lambda_1$. A second portion 116 of the signal is transmitted to second filter 104 and will become at least a portion of an outgoing signal 118. The dropped first portion 114 that comprises wavelength $\lambda_1$ is then transmitted to switch 108, which is selectively controlled by token controller 110. Specifically, when switch 108 is in the "open" position, first portion 114 is dropped or blocked. Conversely, when switch 108 is in the "closed" position, first portion 114 is passed to third filter 106, which then operates to add first portion 114 back to outgoing signal.

In the illustrated embodiment, second filter 104 is used to further suppress wavelength $\lambda_1$ in the outgoing signal. For example, where first filter 102 leaves a trace of wavelength $\lambda_1$ in second portion 116, second filter 104 may remove a residual portion 120 of wavelength $\lambda_1$ from second portion 116. In this manner, first filter 102 and second filter 104 may operate cumulatively to remove or substantially remove any optical signals of wavelength $\lambda_1$ from the optical ring 16. Because residual portion 120 comprises only a trace of wavelength $\lambda_1$, residual portion 120 may not be transmitted to switch 108. Accordingly, residual portion 120 may be blocked whether or not signal 108 is in the open or closed position.

In a source-stripping design, the configuration and reconfiguration of burst blocker 100 is coordinated with the configuration and reconfiguration of the lasers. For example, where burst blocker 100 is placed in the optical components 30 of FIG. 3, burst blocker 100 is coordinated with the configuration and reconfiguration of lasers 46. Accordingly, if a laser 46 is to transmit a token-controlled optical signal with a fixed wavelength of $\lambda_1$, the opening and closing of switch 108 is coordinated with the configuration of the $\lambda_1$ laser within lasers 46. When the $\lambda_1$ laser is transmitting, token controller 110 opens switch 108 to block any incoming optical signal of wavelength $\lambda_1$ to avoid collision with ongoing transmission. If the $\lambda_1$ laser is not transmitting, however, token controller 110 closes switch 108 such that optical signal of wavelength $\lambda_1$ simply passes through burst blocker 100 and the following add coupler 50 with little loss. In either scenario, any data channels of a wavelength different from $\lambda_1$ pass through burst blocker 100 with little loss.

In the above-described source-stripping scenario, each node 12 on ring 16 includes a burst blocker 100 for each laser 46 connected to add coupler 50 within the particular node 12. The wavelengths or bands of the burst blockers 100 and the wavelengths or bands of the lasers 46 match. For example, if a node 12 includes lasers 46 for transmitting at $\lambda_1$, $\lambda_2$, and $\lambda_3$, the node 12 also includes burst blockers for blocking optical bursts transmitted at these same wavelengths. Where multiple lasers are employed to transmit at more than one wavelength or band by node 12, multiple burst blockers 100 are cascaded together between the drop coupler 40 and add coupler 50. In such an embodiment (a burst blocker 100 utilized for source-stripping), ring 16 may also include at least one rejection filter to filter out signal and noise that are outside the frequency spectrums of real burst transmission. The rejection filter prevents noise such as amplified spontaneous emission noise (ASE) from circulating along ring 16.

Burst blocker 100 may also be used for destination-stripping. However, because the cascading together of burst blockers 100 may result in a complex design, burst blocker 100 may lend itself more readily to source-stripping than destination stripping. As described above, a source-stripping burst blocker includes a filter for each wavelength or band on which that particular node 12 may transmit. Thus, if node 12a transmits at $\lambda_1$, $\lambda_2$, and $\lambda_3$, a source-stripping burst blocker 100 would include a series of first, second, and third filters for each of wavelengths $\lambda_1$, $\lambda_2$, and $\lambda_3$, respectively. In contrast, a destination-stripping burst blocker includes a filter for each wavelength on which all nodes 12 of ring 16 may transmit. To continue the above-described example, if node 12a transmits at $\lambda_1$, $\lambda_2$, and $\lambda_3$, node 12b transmits at $\lambda_4$, node 12c transmits at $\lambda_5$, and node 12d transmits at $\lambda_6$, a destination-stripping burst blocker 100 may include a series of first, second, and third filters for each of wavelengths $\lambda_1$, $\lambda_2$, $\lambda_3$, $\lambda_4$, $\lambda_5$, and $\lambda_6$. Accordingly, when bursts of multiple wavelengths or bands of wavelengths need to be blocked at a node 12, the design of FIG. 4 may become cumbersome.

FIG. 5 illustrates a configurable burst blocker 200 for blocking multiple wavelengths or bands in accordance with another embodiment of the present invention. In the illustrated embodiment, burst blocker 200 includes a bank of demultiplexing (demux) filters $202_{a-z}$ and a bank of multiplexing (mux) filters $204_{a-z}$. In particular embodiments, the demux filters $202_{a-z}$ and mux filters $204_{a-z}$ may include an appropriate combination of TFFs. In the illustrated embodiment, each demux filter $202_{a-z}$ is paired with a mux filter $204_{a-z}$, and a switch $206_{a-z}$ separates the pair. Switches $206_{a-z}$ operate to selectively open and close in response to tokens received from token controller 208. In particular embodiments, switches $206_{a-z}$ may include EO switches that operates at sub-micro second switching times. Specifically, when a switch $206_{a-z}$ is in the open position, burst blocker 200 operates to remove a specific data channel from the transmission ring 16. Although banks of demux and mux filters are illustrated, it is generally recognized that burst blocker 200 may include a single demux filter 202 and a single mux filter 204 where only a single data channel is blocked by the burst blocker 200.

In the illustrated embodiment, each demux filter $202_{a-z}$ is configured to remove a specific wavelength or band from an incoming signal 210. Thus the bank of demux filters $202_{a-z}$ cooperate to separate incoming signal 210 into multiple individual data channels. In an example scenario, incoming signal 210 enters a first demux filter $202_a$, which is designed to block a data channel corresponding with wavelength $\lambda_1$. Thus, first demux filter $202_a$ has a center frequency of $\lambda_1$ and operates to drop a first portion $212_a$ of the signal that comprises wavelength $\lambda_1$. The dropped first portion $212_a$ that comprises wavelength $\lambda_1$ is then transmitted to switch $206_a$, which is selectively controlled by token controller 208. When switch $206_a$ is in the "open" position, first portion $212_a$ is dropped or blocked. Conversely, when switch $206_a$ is in the "closed" position, as shown, first portion $212_a$ is passed to a first mux filter $204_a$, which then operates to add first portion $212_a$ back to what will become outgoing signal 214. Thus, the position of switch $206_a$ determines whether an optical burst will be dropped or continued onto ring 16.

Continuing the example scenario further, the data channels not corresponding with $\lambda_1$ are transmitted to a second demux filter $202_b$, which is designed to block a data channel corresponding with wavelength $\lambda_2$. Thus, second demux filter $202_b$ has a center frequency of $\lambda 2$ and operates to drop a second portion $212_b$ of the signal that comprises wavelength $\lambda_2$. The dropped second portion $212_b$ that comprises wavelength $\lambda_2$ is then transmitted to switch $206_b$, which is selectively controlled by token controller 208. As stated above, when switch $206_b$ is in the "open" position, second portion $212_b$ is dropped or blocked. Conversely, when switch $206_b$ is in the "closed" position, as shown, second portion $212_b$ is passed to a second mux filter $204_b$, which then operates to add second portion $212_b$ to first portion $212_a$.

The banks of demux filters $202_{a-z}$ and mux filters $204_{a-z}$ operate in this manner until the multiple wavelengths or bands within incoming signal 210 have been similarly processed. In the illustrated embodiment, only switch $206_z$ is open. Thus, if the demux filter $202_z$ associated with switch $206_z$ will operate to block an optical burst. Thus, if demux filter $202_z$ is designed to block optical signals of wavelength $\lambda_n$ and has a center frequency of $\lambda_n$, only the portion of incoming signal 210 that is of wavelength $\lambda_n$ will be blocked. In this scenario, mux filter $204_z$ does not operate to add the blocked wavelength back into outgoing signal 214.

Because burst blocker 200 can more easily operate to block multiple wavelengths and bands of wavelength, burst blocker 200 is well suited for destination-stripping designs. In a source-stripping design, if a node 12 does not include a laser for transmitting on a particular data channel, the demux-mux filter pair associated with that data channel may be eliminated. Alternatively, the switch 206 associated with that data channel may be permanently set to the "closed" position since optical bursts on the data channel will not be blocked by the node 12. Conversely, switches 206 that are associated with wavelengths at which the node 12 may transmit may be dynamically configured by token controller 208, which may control both the switch position and laser transmission.

As an additional design benefit of the configuration of burst blocker 200, the transmission port of the bank of demux filters $202_{a-z}$ is not connected to the bank of mux filters $204_{a-z}$. As a result, noise, such as ASE, is filtered out and not added to outgoing signal 214. Accordingly, a rejection filter may be omitted from ring 16.

Figure 6:
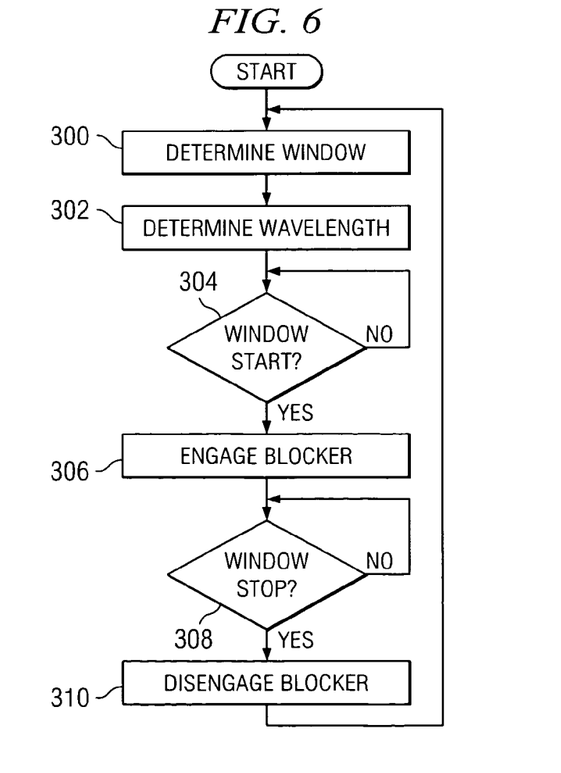
FIG. 6 is a flowchart illustrating a method for blocking data transmissions in a communication network.

FIG. 6 is a flowchart illustrating a method for blocking data transmissions in a communication network. The method begins at step 300 where the window for a data transmission is determined. In particular embodiments, the determination of the window may occur when a token is received that authorizes or otherwise schedules a data channel transmission. The token may be received as a control message. The window specified by the token may include transmission timings. For example, the token may specify a start time and a stop time.

At step 302, the wavelength associated with the data channel transmission is determined. The wavelength may specify a particular wavelength or band of wavelengths that will be reserved for the data channel transmission during the identified window of time. In particular embodiments, the wavelength information may also be received in the token or other control message that authorizes or schedules the data transmission.

At step 304, a determination is made as to whether the window start has begun. For example, where the window includes a transmission timing such as a start time, a determination may be made as to whether or not the start time has occurred or has passed. Where the window start time has not occurred or passed, the method continues to cycle through step 304 and the determination is repeated as necessary until it is determined that the window start time has occurred or has passed. At this time, burst blockers 52 may be engaged at step 306. If a source-stripping design is implemented, engaging burst blockers 52 may include engaging a burst blocker 52 that is associated with the source node 12 of the scheduled data transmission. If a destination-stripping burst blocker 52 is implemented, engaging burst blockers 52 may include engaging a burst blocker associated with a destination node 12 of the scheduled data transmission. The operation of the burst blockers 52 while engaged is described in more detail with regard to FIGS. 4 and 5 above.

At step 308, a determination is made as to whether the window associated with the data transmission has passed. For example, where the window includes transmission timings such as a stop time, a determination may be made as to whether or not the stop time has passed. Where the window stop time has not passed, the method continues to cycle through step 308 and the determination is continuously or periodically repeated until it is determined that the window stop time has passed. At this time, burst blockers 52 may be disengaged at step 310. If a source-stripping design is implemented, disengaging burst blockers 52 may include disengaging a burst blocker 52 that is associated with the source node 12 of the scheduled data channel transmission. If a destination-stripping burst blocker 52 is implemented, disengaging burst blockers 52 may include disengaging a burst blocker associated with a destination node 12 of the scheduled data channel transmission. The method may then return to step 300 and steps 300-310 repeated for a subsequent token-controlled data channel transmission.

The proceeding diagrams and flowcharts illustrate particular methods for token-controlled data channel transmissions in communication networks. However, these diagrams and flowcharts illustrate only exemplary methods of operation, and network 10 contemplates nodes 12 using any suitable techniques, elements, and applications for performing these functions. Thus, many of the steps in the diagrams and flowcharts may take place simultaneously and/or in different orders than as shown. In addition, nodes 12 may use methods with additional steps or fewer steps, so long as the methods remain appropriate. Moreover, other elements of network 10, such as intermediate nodes 12, destination nodes 12, or other suitable components may perform similar techniques to transmit data in network 10 using tokens.

Although the present invention has been described in multiple embodiments, a myriad of changes and modifications may be suggested to one skilled in the art, and it is intended that the present invention encompass such changes and modifications as fall within the present appended claims.

What is claimed is:

1. An optical node comprising:
   a data interface coupled to an optical transmission medium having a plurality of data channels;
   a burst blocker for the selective transmission of the plurality of data channels;
   a controller for:
      receiving a token comprising transmission data specifying one of the data channels and a time window; and
      selectively configuring the burst blocker, based at least in part on the transmission data, for the selective communication of the specified data channel on the optical transmission medium;
   wherein the burst blocker is coupled to and configurable by the controller to:
      use a first filter to split the specified data channel from the plurality of data channels,
      use the first filter to pass the plurality of data channels other than the specified data channel,
      in a first configuration, rejoin the specified data channel with the plurality of data channels for transmission of the plurality of data channels toward a destination node;
      in a second configuration, block the specified data channel to prevent the transmission of the specified data channel beyond the optical node; and
   wherein the burst blocker operates in the second configuration during the time window.

2. The optical node of claim 1, wherein the specified data channel comprises an optical transmission of a specified wavelength.

3. The optical node of claim 1, wherein the burst blocker comprises:
   a first filter operable to split the specified data channel from the plurality of data channels;
   a switch coupled to the first filter and operable to receive the specified data channel, the switch configurable by the controller to:
      in a first configuration, pass the specified data channel; and
      in a second configuration, block the specified data channel;
   a second filter coupled to the switch and operable to rejoin the specified data channel with the plurality of data channels when the switch is in the first configuration.

4. The optical node of claim 3, wherein the first and second fillers comprise first and second thin film filters.

5. The optical node of claim 3, wherein the switch comprises an Electro-optic (EO) switch operable to alternate between the first and second configurations in less than a micro second.

6. The optical node of claim 1, wherein the burst blocker comprises:
a plurality of demultiplexing filters, each demultiplexing filter operable to split an associated data channel from the plurality of data channels and pass the plurality of data channels other than the associated data channel;
a plurality of switches, each switch coupled to an associated demultiplexing filter and operable to receive the associated data channel from the associated demultiplexing filter, each switch configurable by the controller to:
in a first configuration, pass the received associated data channel; and
in a second configuration, block the received associated data channel;
a plurality of multiplexing filters, each multiplexing filter coupled to an associated switch and operable to rejoin the received associated data channel with the plurality of data channels when the associated switch is in the first configuration.

7. The optical node of claim 6, wherein the plurality of multiplexing filters comprises a plurality of multiplexing thin film filters and the plurality of demultiplexing filters comprises a plurality of demultiplexing thin film filters.

8. The optical node of claim 6, wherein each of the plurality of demultiplexing filters is operable to remove an associated wavelength from the plurality of data channels.

9. The optical node of claim 6, wherein each of the plurality of demultiplexing filters is operable to remove an associated band of wavelengths from the plurality of data channels.

10. The optical node of claim 6, wherein each of the plurality of switches comprise an Electro-optic (EO) switch operable to alternate between the first and second configurations in less than a micro second.

11. The optical node of claim 1, wherein the burst blocker is coupled to a drop coupler and an add coupler, the burst blocker operable to receive the plurality of data channels from at least one of the drop coupler or the add coupler, the burst blocker operable to pass at least a portion of the plurality of data channels to the other of the drop coupler or the add coupler.

12. The optical node of claim 1, wherein the transmission data specifies a destination node for the specified data channel, the controller operable to configure the burst blocker in the second configuration when the optical node is the destination node to prevent the transmission of the specified data channel beyond the destination node.

13. The optical node of claim 1, wherein the transmission data specifies a source node for the specified data channel, the controller operable to configure the burst blocker in the second configuration when the optical node is the source node to prevent the further transmission of the specified data channel beyond the source node.

14. The optical node of claim 1, wherein the specified data channel comprises an optical transmission within a specified band of wavelengths.

15. A burst blocker of an optical node comprising:
a first filter coupled to an optical transmission medium having a plurality of data channels, the first filter receiving an optical transmission comprising a plurality of data channels, the first filter splitting a specified data channel from the plurality of data channels and passing the plurality of data channels other than the specified data channel to a destination node without splitting;
a switch coupled to the first filter, the switch for:
receiving the specified data channel;
in a first configuration, passing the specified data channel for transmission of the plurality of data channels toward the destination node; and
in a second configuration, blocking the specified data channel to prevent the transmission of the specified data channel beyond the optical node;
a second filter coupled to the switch and the first filter, the second filter for:
receiving at least a portion of the plurality of data channels from the first filter; and
rejoining the specified data channel with the plurality of data channels when the switch is in the first configuration.

16. The burst blocker of claim 15, wherein the burst blocker is coupled to a controller operable to receive a token comprising transmission data identifying the specified data channel and a time window, the burst blocker operating in the second configuration during the time window.

17. The burst blocker of claim 15, further comprising a third filter coupled between the first and second filters, the third filter for:
receiving the portion of the plurality of data channels from the first filter, the portion of the plurality of data channels other than the specified data channel split by the first filter;
filtering the portion of the plurality of data channels other than the specified data channel split by the first filter to remove a trace portion of the specified data channel from the portion of the plurality of data channels; and
passing a remaining portion of the plurality of data channels to the second filter.

18. The burst blocker of claim 15, wherein the specified data channel comprises an optical transmission of a specified wavelength.

19. The burst blocker of claim 15, wherein the specified data channel comprises an optical transmission within a specified band of wavelengths.

20. The burst blocker of claim 15, wherein the first and second filters comprise first and second thin film filters.

21. The burst blocker of claim 15, wherein the switch comprises an Electro-optic (EO) switch operable to alternate between the first and second configurations in less than a micro second.

22. The burst blocker of claim 15, wherein the first filter is operable to receive the plurality of data channels from one of a drop coupler or an add coupler, the second filter operable to pass the portion of the plurality of data channels to the other of the drop coupler or the add coupler.

23. The burst blocker of claim 15, wherein the burst blocker is incorporated into an optical node identified as a destination optical node for the specified data channel, the switch operating in the second configuration to prevent the transmission of the specified data channel beyond the destination node.

24. The burst blocker of claim 15, wherein the burst blocker is incorporated into an optical node identified as a source optical node for the specified data channel, the switch operating in the second configuration to prevent the further transmission of the specified data channel beyond the source node.

25. A method for token-controlled data transmission comprising:
receiving a token comprising transmission data specifying one of a plurality of data channels and a time window;

selectively configuring a burst blocker, based at least in part on the transmission data, for the selective communication of the specified data channel on an optical transmission medium having the plurality of data channels;
wherein selectively configuring the burst blocker comprises:
using a first filter to receive the plurality of data channels at the burst blocker
using the first filter to split the specified data channel from the plurality of data channels;
using the first filter to pass the plurality of data channels other than the specified data channel to a destination node without splitting,
configuring the burst blocker in a first configuration during a time other than the time window to rejoin the specified data channel with the plurality of data channels for transmission of the plurality of data channels toward the destination node; and
configuring the burst blocker in a second configuration during the time window to block the specified data channel to prevent the transmission of the specified data channel.

26. The method of claim 25, wherein the specified data channel comprises an optical transmission of a specified wavelength.

27. The method of claim 25, wherein the specified data channel comprises an optical transmission within a specified band of wavelengths.

28. The method of claim 25, further comprising:
using the first filter to split the specified data channel from the plurality of data channels;
configuring a switch, based at least in part on the transmission data, in a first configuration to pass the specified data channel or in a second configuration to block the specified data channel; and
using a second filter coupled to the switch to rejoin the specified data channel with the plurality of data channels when the switch is in the first configuration.

29. The method of claim 28, wherein using the first filter comprises using a first thin film filter and wherein using the second filter comprises using a second thin film filter.

30. The method of claim 28, wherein the switch comprises an Electro-optic (EO) switch operable to alternate between the first and second configurations in less than a micro second.

31. The method of claim 25, further comprising:
configuring the burst blocker in the second configuration when the optical node is identified by the transmission data as a destination node for the specified data channel to prevent the transmission of the specified data channel beyond the destination node.

32. The method of claim 25, further comprising:
configuring the burst blocker in the second configuration when the optical node is identified by the transmission data as a source node for the specified data channel to prevent the further transmission of the specified data channel beyond the source node.

33. A method for token-controlled data transmission comprising:
receiving an optical transmission comprising a plurality of data channels;
using a first filter to split a specified data channel from the plurality of data channels;
using the first filter to pass the plurality of data channels other than the specified data channel to a destination node without splitting, receiving the specified data channel at a switch;
using the switch to pass the specified data channel when the switch is in a first configuration and block the specified data channel when the switch is in the second configuration;
receiving, at a second filter, the plurality of data channels other than the specified data channel from the first filter; and
rejoining, at the second filter, the specified data channel with the plurality of data channels other than the specified data channel when the switch is in the first configuration.

34. The method of claim 33, wherein using the switch to pass or block the specified data channel comprises:
receiving configuration data comprising a time window from a controller; and
configuring the switch in the first configuration during the time window; and
configuring the switch in the second configuration during a time outside the time window.

35. The method of claim 33, further comprising:
coupling a third filter between the first and second filters;
receiving, at the third filter, at least a portion of the plurality of data channels from the first filter, the portion of the plurality of data channels other than the specified data channel split by the first filter;
filtering the portion of the data channels other than the specified data channel split by the first filter to remove a trace portion of the specified data channel from the portion of the data channels; and
passing a remaining portion of the data channels to the second filter.

36. The method of claim 33, wherein using the first filter to split the specified data channel from the plurality of data channels comprises using the first filter to split a specified wavelength from the plurality of data channels.

37. The method of claim 33, wherein using the first filter to split the specified data channel from the plurality of data channels comprises using the first filter to split a specified band of wavelengths from the plurality of data channels.

38. The method of claim 33, wherein the first and second filters comprise first and second thin film filters.

39. The method of claim 38, wherein the switch comprises an Electro-optic (EO) switch operable to alternate between the first and second configurations in less than a micro second.

40. The method of claim 33, further comprising:
receiving, at the first filter, the plurality of data channels from one of a drop coupler and an add coupler; and
transmitting, from the second filter, the portion of the data channels to the other of the drop coupler and the add coupler.

41. The method of claim 33, further comprising:
configuring the switch in the second configuration when the burst blocker is incorporated into an optical node identified as the destination optical node for the specified data channel; and
preventing the transmission of the specified data channel beyond the destination node.

42. The method of claim 33, further comprising:
configuring the switch in the second configuration when the burst blocker is incorporated into an optical node identified as a source optical node for the specified data channel; and
preventing the further transmission of the specified data channel beyond the source node.

43. An optical node comprising:
means for receiving a token comprising transmission data specifying one of a plurality of data channels and a time window;
means for using; a burst blocker for the selective transmission of the plurality of data channels;
means for selectively configuring the burst blocker, based at least in part on the transmission data, for the selective communication of the specified data channel on an optical transmission medium having the plurality of data channels;
wherein selectively configuring the burst blocker comprises:
use a first filter to split the specified data channel from the plurality of data channels;
use the first filter to pass the plurality of data channels other than the specified data channel to a destination node without splitting,
configuring the burst blocker in a first configuration during a time other than the time window to rejoin the specified data channel with the plurality of data channels for transmission of the plurality of data channels toward a destination node; and
configuring the burst blocker in a second configuration during the time window to block the specified data channel to prevent the transmission of the specified data channel.

44. A burst blocker comprising:
means for receiving an optical transmission comprising a plurality of data channels;
means for using a first filter to split a specified data channel from the plurality of data channels;
means for using the first filter to pass the plurality of data channels other than the specified data channel to a destination node without splitting,
means for receiving the specified data channel at a switch;
means for using the switch to pass the specified data channel when the switch is in a first configuration and block the specified data channel when the switch is in the second configuration;
means for receiving, at a second filter, at least a portion of the plurality of data channels from the first filter; and
means for rejoining, at the second filter, the specified data channel with the plurality of data channels when the switch is in the first configuration.

* * * * *